United States Patent
Li

(10) Patent No.: US 9,578,612 B2
(45) Date of Patent: Feb. 21, 2017

(54) NODE DEVICE AND METHOD FOR COMMUNICATION

(71) Applicant: HON HAI PRECISION INDUSTRY CO., LTD., New Taipei (TW)

(72) Inventor: Min-Wei Li, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 103 days.

(21) Appl. No.: 14/512,994

(22) Filed: Oct. 13, 2014

(65) Prior Publication Data

US 2015/0312868 A1    Oct. 29, 2015

(30) Foreign Application Priority Data

Apr. 25, 2014    (CN) .......................... 2014 1 01738018

(51) Int. Cl.
*G08C 17/00* (2006.01)
*H04W 56/00* (2009.01)
*H04W 52/02* (2009.01)

(52) U.S. Cl.
CPC ....... *H04W 56/001* (2013.01); *H04W 52/0203* (2013.01); *Y02B 60/50* (2013.01)

(58) Field of Classification Search
CPC ............. H04W 52/02; H04W 52/0219; H04W 52/0235; H04W 52/0285
See application file for complete search history.

(56) References Cited

U.S. PATENT DOCUMENTS

| | | | |
|---|---|---|---|
| 2005/0135302 | A1 | 6/2005 | Wang et al. |
| 2010/0118209 | A1* | 5/2010 | Hardacker ............. G08C 17/02 348/734 |
| 2011/0255528 | A1 | 10/2011 | Zakrzewski |
| 2011/0280167 | A1 | 11/2011 | Bornstein et al. |
| 2011/0311052 | A1* | 12/2011 | Myers ................ G07C 9/00103 380/270 |
| 2012/0176941 | A1 | 7/2012 | Bata et al. |
| 2015/0179130 | A1* | 6/2015 | Smadi .................... G09G 5/006 345/520 |

FOREIGN PATENT DOCUMENTS

| CN | 1681342 A | 10/2005 |
|---|---|---|
| CN | 101132299 A | 2/2008 |
| CN | 102685780 A | 9/2012 |

* cited by examiner

*Primary Examiner* — Alvin Zhu
(74) *Attorney, Agent, or Firm* — Zhigang Ma

(57) ABSTRACT

A node device switches from a sleep mode to a wake-up mode when the node device needs to transmit information. The node device transmits a synchronization signal to the another node device based on the information and determines whether an acknowledgement signal is received. The node device transmits the key-frames to the another node device when the acknowledgement signal is received.

2 Claims, 4 Drawing Sheets

NODE DEVICE AND METHOD FOR COMMUNICATION

CROSS-REFERENCE TO RELATED APPLICATIONS

This application claims priority to Chinese Patent Application No. 201410173801.8 filed on Apr. 25, 2014 in the China Intellectual Property Office, the contents of which are incorporated by reference herein.

FIELD

The present disclosure generally relates to communication between network devices.

BACKGROUND

Currently, node devices in the Z-wave, such as Z-wave controllers and Z-wave terminal devices, are usually battery powered. The node devices for receiving are generally in a sleep mode, and periodically wake up to receive information by setting a wake-up interval. When the node devices for transmitting are going to transmit information, they cannot assume that the node devices for receiving are in the wake-up mode. The information being all transmitted at one time, the node devices for transmitting cannot know whether the transmitting is successful. Thus results in transmission failure and battery consumption.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
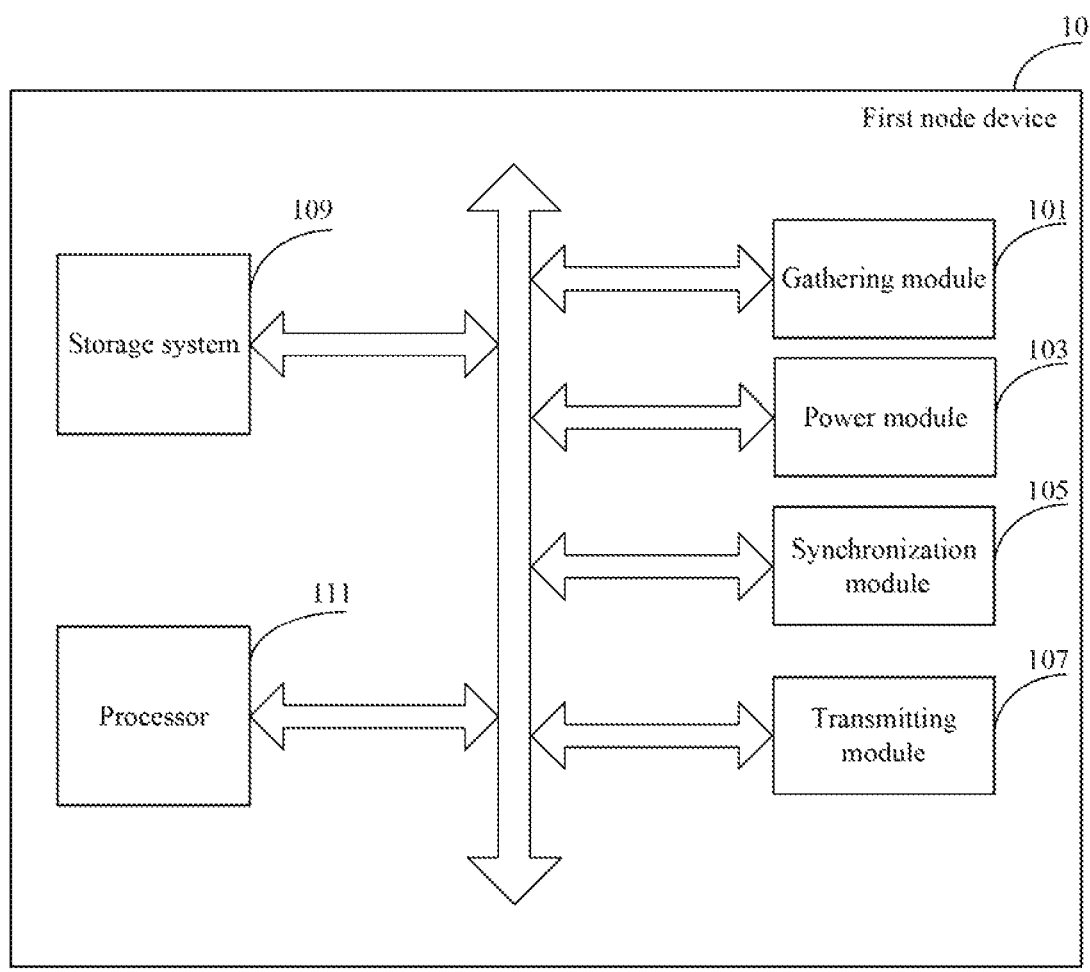
FIG. 1 is a block diagram of one embodiment of a first node device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module" as used hereinafter, refers to logic embodied in hardware or firmware, or to a collection of software instructions, written in a programming language, such as, for example, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a block diagram of one embodiment of a first node device. In one embodiment, the first node device (first node device 10) is used to transmit information to other node devices. The first node device 10 may be used to receive the input orders from a user and transmit information to the other node devices, transmit status information of itself to the other node devices, and transfer information sent by the other node devices. The present disclosure is not limited to any such use.

The first node device 10 comprises a gathering module 101, a power module 103, a synchronization module 105, a transmitting module 107, a storage system 109, and a processor 111. The modules 101-107 can include computerized code in the form of one or more programs. The one or more programs are stored in the storage system 109, and the storage system 109 can be a non-transitory device. The computerized code includes instructions executed by the processor 111 to provide functions for the modules 101-107.

In the present embodiment, the power module 103 places the first node device 10 into sleep mode. In order to save power, the initialization state of the first node device 10 is in sleep mode.

In the present embodiment, the gathering module 101 determines whether the transmission of information is needed. The gathering module 101 detects whether a user has input any instructions, and the transmission of such information is necessary when the user has input instructions. In other embodiments, the gathering module 101 can also detect whether there is a need to transmit status information or a need to transfer information received from other node devices. The present disclosure is not limited thereto.

In the present embodiment, when there is a need to transmit information, the power module 103 switches the first node device 10 from sleep mode to wake-up mode.

In the present embodiment, the synchronization module 105 transmits the synchronization signal to other node devices based on the information needing to be transmitted. In the Z-Wave network, information comprises synchronizing signals and key-frames. The synchronization signals are used for synchronization between node devices, and the key-frames contain the actual data to be transmitted. Current node devices usually require to transmit the entire information. The synchronization module 105 first transmits a synchronization signal to other node devices, to establish synchronization with the other node devices, thus avoiding the transmission of the entire information.

In the present embodiment, the synchronization module 105 determines whether acknowledgement of signal is received. The acknowledgement signal is transmitted by the other node device which has received the synchronization signal. When the synchronization module 105 has received an acknowledgement signal, it indicates that other node device has received the synchronization signal transmitted by the synchronization module 105. By determining whether or not an acknowledgment signal is received, any adverse influences of the communication network in a particular environment are avoided, to ensure stability of the communication.

In the present embodiment, the transmitting module 107 transmits the key-frames to the node device which issued the acknowledgement signal. When the synchronization module 105 receives the acknowledgement signal, the transmitting module 107 transmits the key-frames to the node device which responds to the acknowledgement signal. The length of the key-frames always being short, it can be transmitted in a short duration and will not be effected by the environment. In other embodiments, when the key-frames have been transmitted, the transmitting module 107 can also determine whether any response to the key-frames is received.

In the present embodiment, when an acknowledgement signal is not received, the synchronization module 105 transmits a synchronization signal again, and in counting the number of transmission times plus one, the synchronization module 105 determines whether the number of transmission times is larger than a first preset value. The first preset value indicates the maximum number of times to transmit a synchronization signal when an acknowledgement signal is not received, and the first preset value can be set according to the actual environment. The initial number of transmission times is zero, and this number is increased by one every time that the synchronization module 105 transmits a synchronization signal.

In the present embodiment, when the synchronization module 105 determines that the number of transmission times is larger than the first preset value in block 309, or when the transmitting module 107 has transmitted the key-frames, the synchronization module 105 resets the number of transmission times to zero. The power module 103 switches the first node devices to sleep mode.

Figure 2:
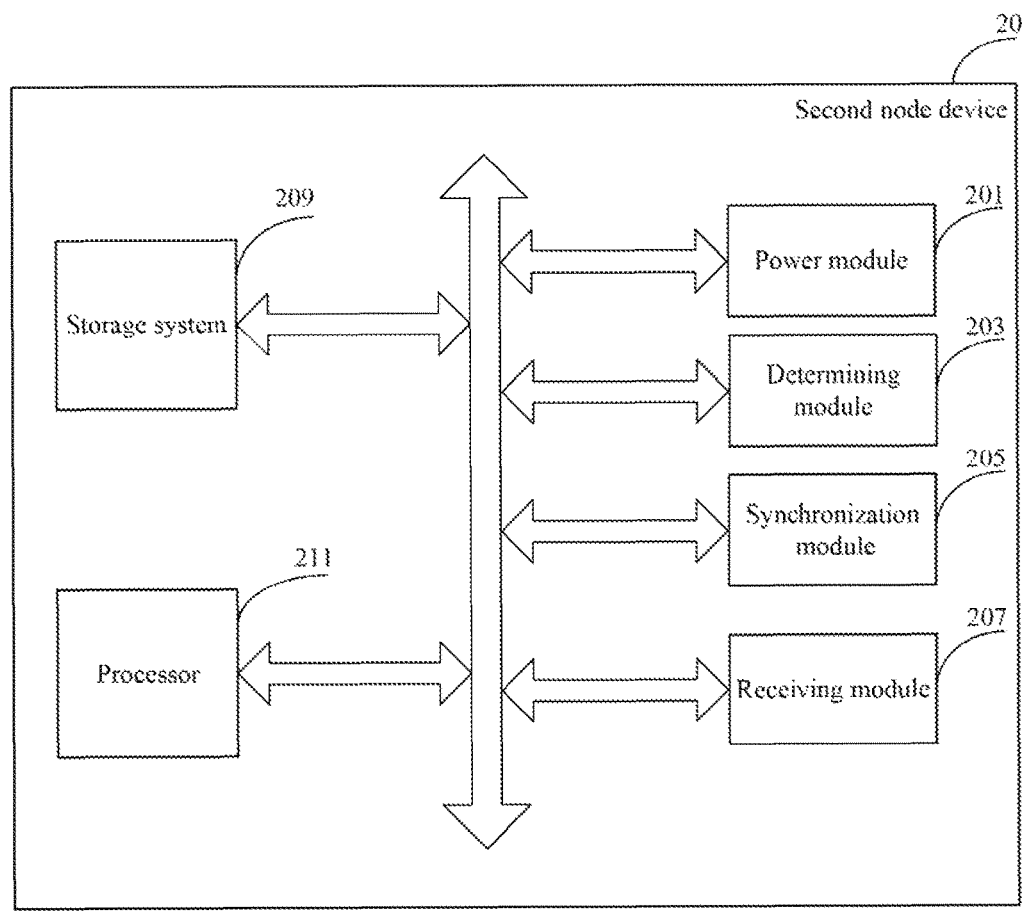
FIG. 2 is a block diagram of one embodiment of a second node device.

FIG. 2 is a block diagram of one embodiment of a second node device (second node device 20). In one embodiment, the second node device 20 is used to receive information such as control information and status information transmitted by other node devices. The second node device 20 comprises a power module 201, a determining module 203, a synchronization module 205, a receiving module 207, a storage system 209, and a processor 211. The module 201-207 can include computerized code in the form of one or more programs. The one or more programs are stored in the storage system 209, and the storage system 209 can be a non-transitory device. The computerized code includes instructions executed by the processor 211 to provide functions for the modules 201-207.

In the present embodiment, the power module 201 switches the second node device from the sleep mode to the wake-up mode periodically according to a wake-up interval. In the present embodiment, the second node device is used to receive information transmitted by other node devices. The second node device is generally in a sleep mode, and periodically wakes up to receive information. The power module 201 switches the second node device from the sleep mode to the wake-up mode periodically according to the wake-up interval.

In the present embodiment, the power module 201 adds one to the number of wake-up times every time that the power module 201 switches the second node device from the sleep mode to the wake-up mode. Each time after switching from the sleep mode to the wake-up mode, the number of wake-up times is increased by one.

In the present embodiment, the determining module 203 determines whether the number of wake-up times is greater than a second preset value. The second preset value indicates the maximum number of wake-up times, and the second preset value can be set according to the actual environment.

In the present embodiment, when the number of wake-up times is larger than the second preset value, the determining module 203 resets the number of wake-up times to zero.

In the present embodiment, the synchronization module 205 determines whether a synchronization signal transmitted by other node devices has been received.

In the present embodiment, when the synchronization module 205 does not receive any synchronization signal, the power module 201 switches the second node device 20 from wake-up mode to sleep mode.

In the present embodiment, when the synchronization module 205 receives a synchronization signal, the synchronization module 205 transmits an acknowledgement of the signal to the node device that transmitted the synchronization signal. When a synchronization signal has been received, it indicates that the node devices is establishing synchronization with the other node devices, and the key-frames can be transmitted. The synchronization module 205 transmits an acknowledgement signal to the node device that transmitted the synchronization signal, that the key-frames can be transmitted.

In the present embodiment, the receiving module 207 receives the key-frames transmitted by the other node device.

In the present embodiment, when the receiving module 207 has received the key-frames or when the determining module 203 has reset the number of wake-up times zero, the power module 201 determines whether the percentage of battery power remaining of the second node device 20 is less than a third preset value. The third preset value indicates a low battery status, it can be set according to the actual environment, such as between 10% and 30% of capacity.

In the present embodiment, when the percentage of battery power remaining is less than the third preset value, the power module 201 extends the wake-up interval. When the percentage of battery power remaining is less than the third preset value, it indicates that it the battery power of the second node device 20 is low, and further energy-saving operation is needed. The power module 201 can extend the wake-up interval, thus reducing energy consumption. The wake-up interval can be extended to be twice the original period of time. For instance, the initial wake-up interval is 250 ms, and it can be extended to 500 ms, thus the usage time can be extended by 200%.

In the present embodiment, when the percentage of battery power remaining is larger than or equal to the third preset value, or when the power module 201 has extended the wake-up interval, the determining module 203 resets the number of wake-up times zero and the power module 201 switches the second node device 20 from wake-up mode to sleep mode.

In another embodiment, a node device may comprise all the modules of the first node device 10 and the second node device 20, the node device may comprise a gathering module, a power module, a synchronization module, a transmitting module, a determining module, and a receiving module, thus the node device can be used to both transmit and receive information.

Figure 3:
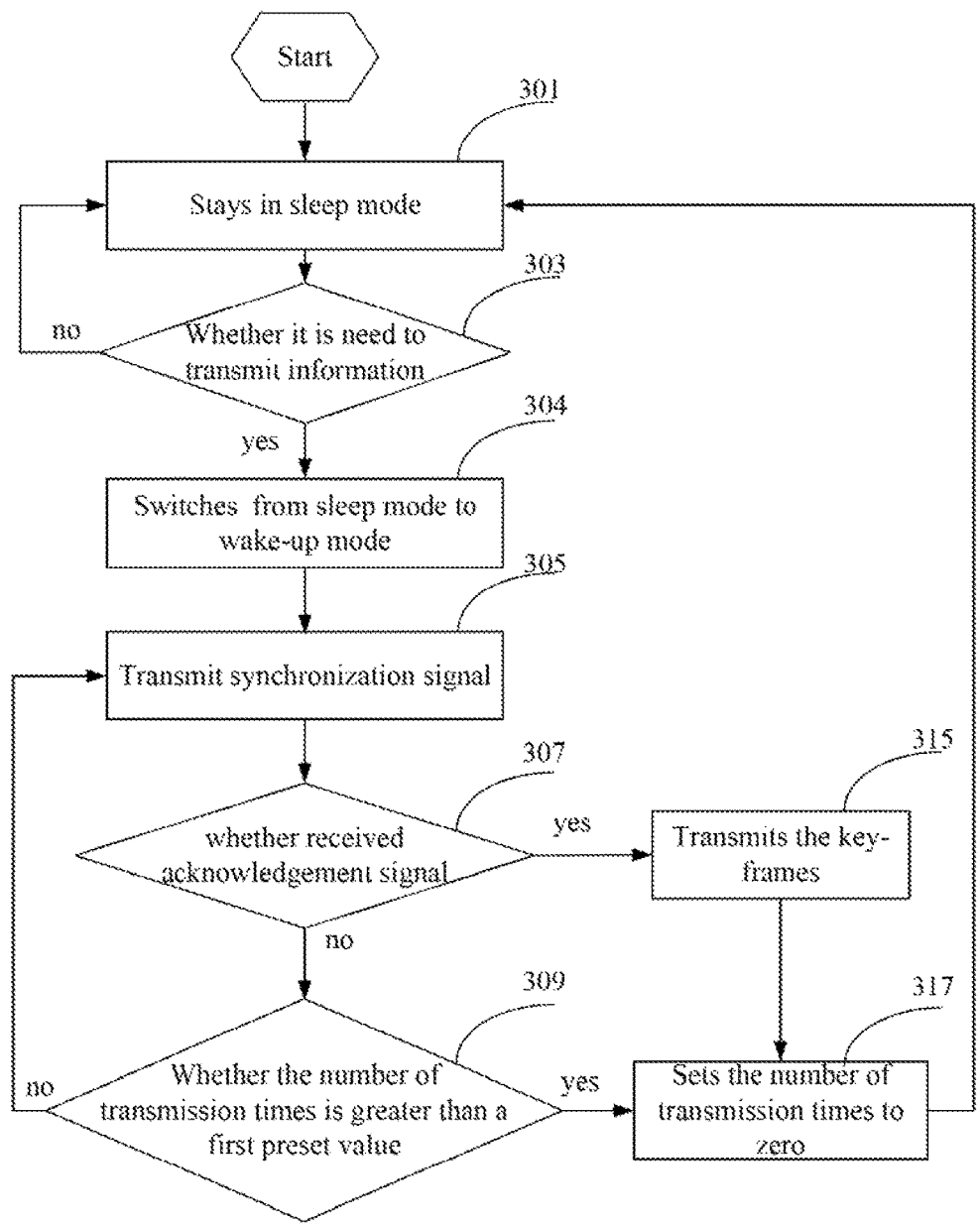
FIG. 3 is a flowchart of one embodiment of a method for communication.

FIG. 3 is a flowchart of one embodiment of a method for communication. In one embodiment, the method functions by modules illustrated in FIG. 1, in the following manner.

In block 301, the power module 103 places the first node device 10 into sleep mode. In order to save power, the initialization state of the first node device 10 is in sleep mode.

In block 303, the gathering module 101 determines whether the transmission of information is needed. In one embodiment, the gathering module 101 detects whether user has input any instructions, and the transmission of such information is necessary when the user has input instructions. In other embodiments, the gathering module 101 can also detects whether there is a need to transmit status information or a need to transfer information received from other node devices. The present disclosure is not limited thereto. If it is need to transmit information, the process proceeds to block 304, otherwise proceeds to block 301 and the first node device will keep in the sleep mode.

In block 304, the power module 103 switches the first node device 10 from sleep mode to wake-up mode.

In block 305, the synchronization module 105 transmits the synchronization signal to other node devices based on the information needing to be transmitted. In the Z-Wave network, information comprises synchronizing signals and key-frames. The synchronization signals are used for synchronization between node devices, and the key-frames contains the actual data to be transmitted. Current node devices usually required to transmit the entire information. In the present embodiment, the synchronization module 105 first transmits a synchronization signal to other node devices, to establish synchronization with the other node devices, thus avoiding the transmission of the entire information.

In block 307, the synchronization module 105 determines whether acknowledgement of signal is received. The acknowledgement signal is transmitted by the other node device which has received the synchronization signal. When the synchronization module 105 has received an acknowledgement signal, it indicates that other node device have received the synchronization signal transmitted by the synchronization module 105, and then proceeds to block 315, otherwise proceeds to block 309. In the present embodiment, by determining whether or not an acknowledgment signal is received, any adverse influences of the communication network in a particular environment are avoided, to ensure stability of the communication.

In block 315, the transmitting module 107 transmits the key-frames to the node device which issued the acknowledgement signal. In the present embodiment, when the synchronization module 105 receives the acknowledgement signal, the transmitting module 107 transmits the key-frames to the node device which responds to the acknowledgement signal. The length of the key-frames always being short, it can be transmitted in a short duration and will not be effected by the environment. In other embodiments, when the key-frames have been transmitted, the transmitting module 107 can also determines whether any response to the key-frames is received. When the key-frames have been transmitted, the process proceeds to block 317.

In block 309, when an acknowledgement signal is not received, the synchronization module 105 transmits a synchronization signal again, and in counting the number of transmission times plus one, the synchronization module 105 determines whether the number of transmission times is larger than a first preset value. The first preset value indicates the maximum number of times to transmit a synchronization signal when an acknowledgement signal is not received, and the first preset value can be set according to the actual environment. In the present embodiment, the initial number of transmission times is zero, and this number is increased by one every time that the synchronization module 105 transmits a synchronization signal. When the number of transmission times is less than or equal to the first preset value, proceeds to block 305; and when the number of transmission times is larger than the first preset value, proceeds to block 317.

In block 317, when the synchronization module 105 determines that the number of transmission times is larger than the first preset value in block 309, or when the transmitting module 107 has transmitted the key-frames, the synchronization module 105 resets the number of transmission times to zero. The process then proceeds to block 301, the power module 103 switches the first node devices to sleep mode.

Figure 4:
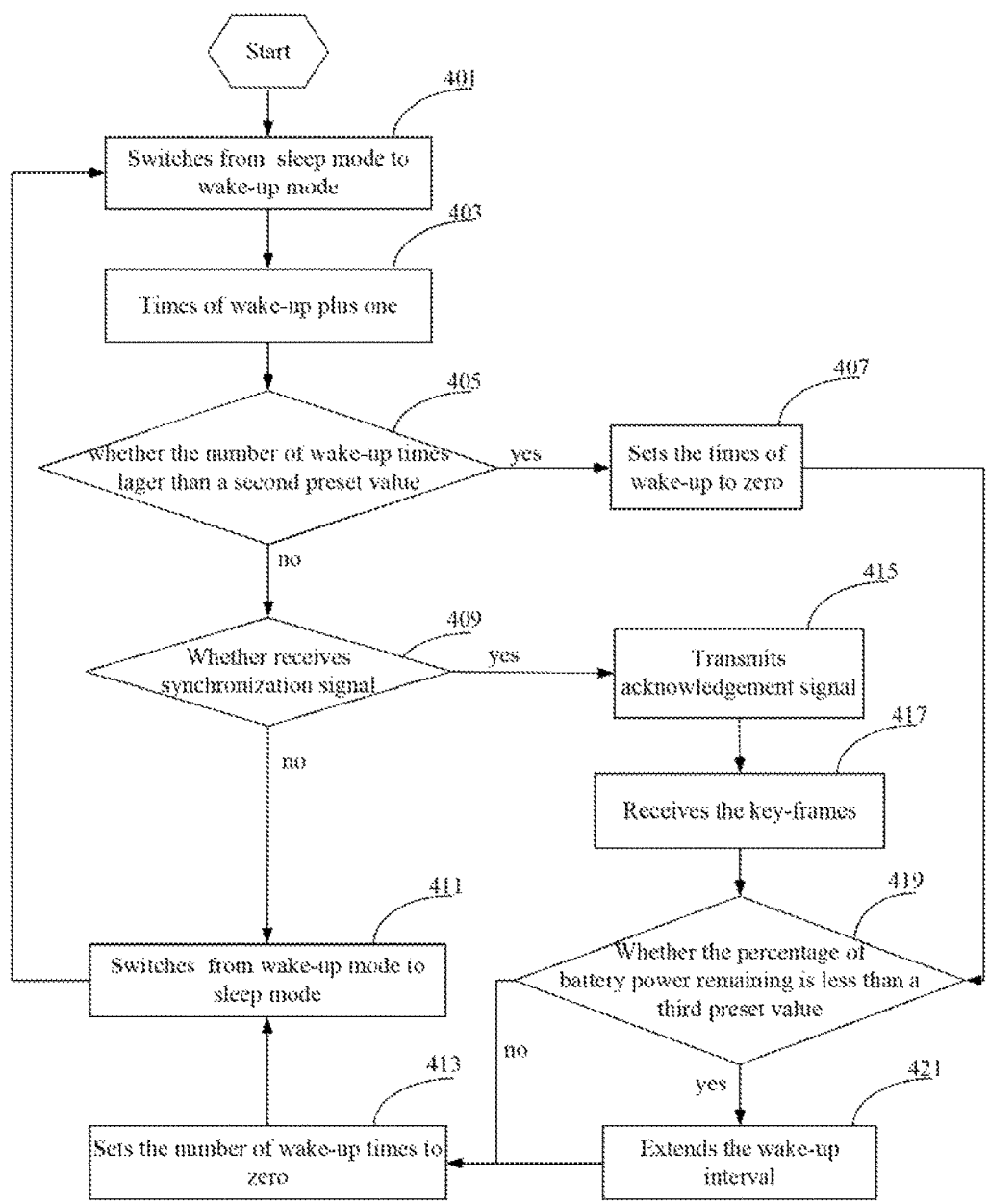
FIG. 4 is a flowchart of an embodiment of another method for communication.

FIG. 4 is a flowchart of another embodiment of a method for communication. In one embodiment, the method functions by modules illustrated in FIG. 2 in the following manner.

In block 401, the power module 201 switches the second node device from the sleep mode to the wake-up mode periodically according to a wake-up interval. In the present embodiment, the second node device is used to receive information transmitted by other node devices. The second node device is generally in a sleep mode, and periodically wakes up to receive information. The power module 201 switches the second node device from the sleep mode to the wake-up mode periodically according to the wake-up interval.

In block 403, the power module 201 adds one to the number of wake-up times every time that the power module 201 switches the second node device from the sleep mode to the wake-up mode. In the present embodiment, each time after switching from the sleep mode to the wake-up mode, the number of wake-up times is increased by one.

In block 405, the determining module 203 determines whether the number of wake-up times is greater than a second preset value. In the present embodiment, the second preset value indicates the maximum number of wake-up times, and the second preset value can be set according to the actual environment. When the number of wake-up times is greater than the second preset value, proceeds to block 407; and when the number of wake-up times is less than or equal to the second preset value, proceeds to block 409.

In block 407, the determining module 203 resets the number of wake-up times to zero. In the present embodiment, when the number of wake-up times is greater than the second preset value, the determining module 203 resets the number of wake-up times to zero.

In block 409, the synchronization module 205 determines whether a synchronization signal transmitted by other node devices has been received. When the synchronization module 205 receives the synchronization signal, proceeds to block 415; otherwise proceeds to block 411.

In block 411, when the synchronization module 205 does not receive any synchronization signal, the power module 201 switches the second node device 20 from wake-up mode to sleep mode. In the present embodiment, when the second node device 20 go in sleep mode, proceeds to block 401, and the power module 201 switches the second node device from the sleep mode to the wake-up mode periodically according to wake-up interval.

In block 415, when the synchronization module 205 receives a synchronization signal, the synchronization module 205 transmits an acknowledgement of the signal to the node device that transmitted the synchronization signal. In the present embodiment, when a synchronization signal has been received, it indicates that the node devices is establishing synchronization with the other node devices, and the key-frames can be transmitted. The synchronization module 205 transmits an acknowledgement signal to the node device that transmitted the synchronization signal, that the key-frames can be transmitted.

In block 417, the receiving module 207 receives the key-frames transmitted by the other node device. In the present embodiment, the other node device transmits the key-frames after receiving the acknowledgement signal.

In block 419, when the receiving module 207 has received the key-frames in block 417 or when the determining module 203 has reset the number of wake-up times to zero, the power module 201 determines whether the percentage of battery power remaining of the second node device 20 is less than a third preset value. In the present embodiment, the third preset value indicates a low battery status, it can be set according to the actual environment, such as between 10% and 30% of capacity. When the percentage of battery power remaining is less than the third preset value, proceeds to block 421; and when the percentage of battery power remaining is larger than or equal to the third preset value, proceeds to block 413.

In block 421, when the percentage of battery power remaining is less than the third preset value, the power module 201 extends the wake-up interval. In the present embodiment, when the percentage of battery power remaining is less than the third preset value, it indicates that it the battery power of the second node device 20 is low, and further energy-saving operation is needed. The power module 201 can extend the wake-up interval, thus reducing energy consumption. The wake-up interval can be extended to be twice the original period of time. For instance, the initial wake-up interval is 250 ms, and it can be extended to 500 ms, thus the usage time can be extended by 200%.

In block 413, when the percentage of battery power remaining is larger than or equal to the third preset value in block 419, or when the power module 201 has extended the wake-up interval, the determining module 203 resets the number of wake-up times to zero. And proceeds to block 411, the power module 201 switches the second node device 20 from wake-up mode to sleep mode.

The node device and the method for communication can assume the synchronization between the node device for transmitting and the node device for receiving, reduce power consumption, and extend the use of time.

Many details are often found in the art such as the other features of a computer. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A node device, connectable with another node device, the node device comprising:
    at least one processor;
    a storage system; and
    one or more programs that are stored in the storage system and executed by the at least one processor, the one or more programs comprising instructions for:
    switching from a sleep mode to a wake-up mode periodically according to a wake-up interval;
    responding an acknowledgement signal when receiving a synchronization signal from the another node device; and
    receiving key-frames from the another node device;
    switching from the wake-up mode to the sleep mode upon condition the synchronization signal is not received;
    adding one to number of wake-up times every time when switching from the sleep mode to the wake-up mode;
    setting the number of wake-up times to zero upon condition that the number of wake-up times is greater than a second preset value;
    extending the wake-up interval upon condition that a percentage of battery power remaining is less than a third preset value.

2. The node device as claimed in claim 1, wherein the one or more programs further comprises instructions for switching from the wake-up mode to the sleep mode upon condition the wake-up interval is extended.

* * * * *